United States Patent
Lipinski et al.

(10) Patent No.: US 6,584,760 B1
(45) Date of Patent: Jul. 1, 2003

(54) EMISSIONS CONTROL IN A RECUPERATED GAS TURBINE ENGINE

(75) Inventors: John Lipinski, Tempe, AZ (US); Karl Fleer, San Pedro, CA (US); Tony Prophet, Albuquerque, NM (US); Peter Zheng, Rancho Palos Verde, CA (US); Di-Jia Liu, Naperville, IL (US); George Lester, Salem, VA (US)

(73) Assignee: Hybrid Power Generation Systems, Inc., Los Angeles, CA (US)

( * ) Notice: Subject to any disclaimer, the term of this patent is extended or adjusted under 35 U.S.C. 154(b) by 0 days.

(21) Appl. No.: 09/659,629

(22) Filed: Sep. 12, 2000

(51) Int. Cl.$^7$ .................................................. F02C 7/10
(52) U.S. Cl. .......................... 60/39.511; 60/723; 165/4
(58) Field of Search ............................. 60/39.511, 723; 165/4

(56) References Cited

U.S. PATENT DOCUMENTS

| | | |
|---|---|---|
| 3,641,763 A | 2/1972 | Cole |
| 3,713,294 A | 1/1973 | Balje et al. |
| 3,717,129 A | 2/1973 | Fox |
| 4,602,673 A * | 7/1986 | Michelfelder et al. ......... 165/7 |
| 4,665,973 A | 5/1987 | Limberg et al. |
| 4,754,607 A | 7/1988 | Mackay |
| 4,912,928 A | 4/1990 | Kaneko et al. |
| 5,274,996 A | 1/1994 | Goff et al. |
| 5,300,265 A | 4/1994 | Banks et al. |
| 5,685,156 A | 11/1997 | Willis et al. |
| 5,855,112 A * | 1/1999 | Bannai et al. ........... 60/39.511 |
| 5,896,738 A | 4/1999 | Yang et al. |

FOREIGN PATENT DOCUMENTS

| | | | |
|---|---|---|---|
| GB | 2118859 | * | 11/1983 |
| JP | 2256816 | | 10/1990 |

* cited by examiner

*Primary Examiner*—Louis J. Casaregola
(74) *Attorney, Agent, or Firm*—Sutherland Asbill & Brennan LLP

(57) ABSTRACT

Emissions are controlled in a recuperated gas turbine engine using an apparatus and/or method. A fixed boundary recuperator comprises a gas inlet through which flows a gas and a gas outlet in communication with the gas inlet. An air inlet flows an air through the recuperator so that the air is in heat exchange relationship with the gas. An air outlet is in communication with the air inlet. A catalyst is disposed at least at one of a plurality of locations, with the locations selected from the group that includes a position immediately upstream of the recuperator heat exchange core, a position within the recuperator heat exchange core, and a position immediately downstream of the recuperator heat exchange core. At least one parameter of the engine is tuned based on desired $NO_x$ emissions and remaining undesired emissions are catalyzed in or immediately adjacent a recuperator.

13 Claims, 5 Drawing Sheets

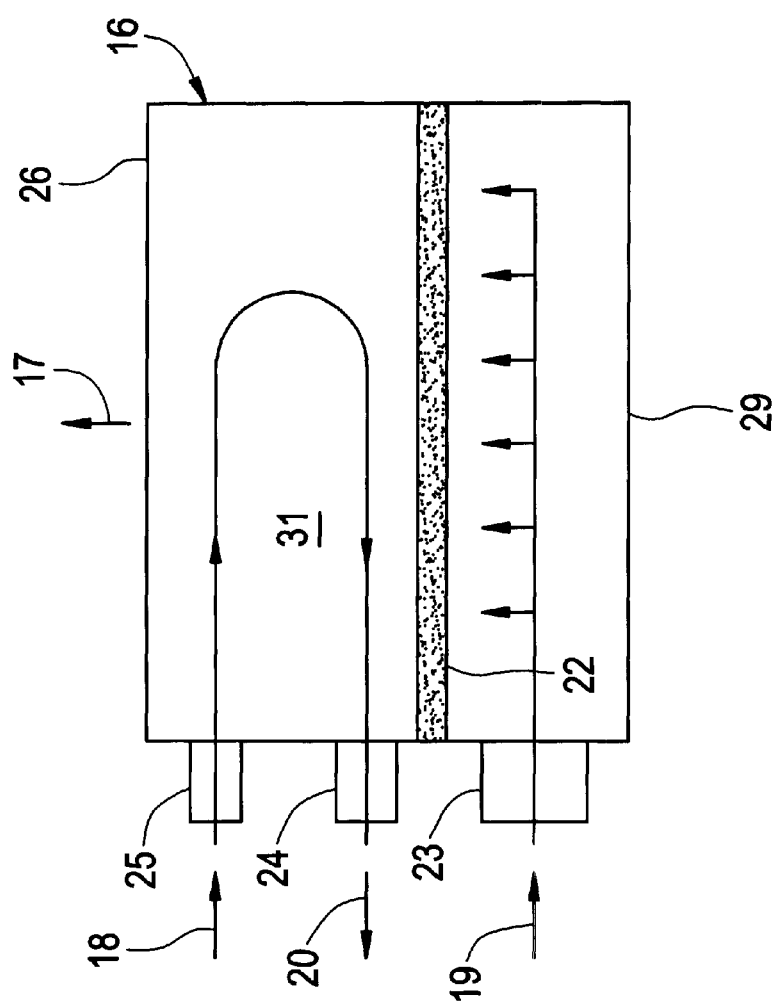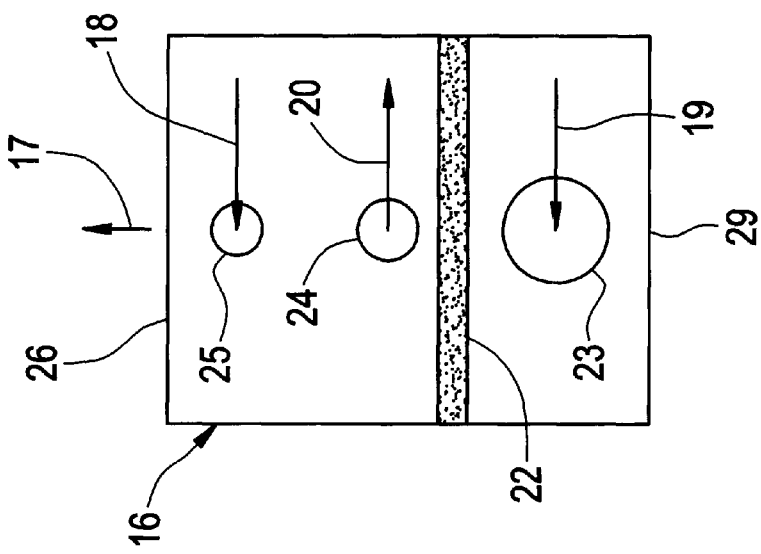

EMISSIONS CONTROL IN A RECUPERATED GAS TURBINE ENGINE

BACKGROUND OF THE INVENTION

The present invention generally relates to recuperators for turbine engines and, more particularly, to an apparatus and method of catalytically treating within or immediately about a recuperator an exhaust gas from a turbine over a broad operating range of engine loads and ambient conditions.

Gas turbine engines commonly employ a compressor for compressing air and a combustor for combusting compressed air and fuel. Hot exhaust gases from the combustor are fed to a turbine to drive a driveshaft. Turbine exhaust is fed to a recuperator that places the exhaust in heat exchange relationship with compressed air from the compressor. The heat exchange heats the compressed air and thereby enables heat recovery by the heated compressed air flowing to the combustor. The result is improved engine efficiency.

However, in a gas turbine engine, exhaust gases typically contain undesired emissions such as carbon monoxide and unburned hydrocarbons. To ameliorate the deleterious effects of these undesired emissions before they are discharged into the atmosphere, the emissions can be reduced through catalytic oxidation and/or reduction. The oxidation and reduction reactions produce relatively harmless products such as carbon dioxide and water.

Carbon monoxide is produced in the gas phase-oxidation of fuel in the combustor of the gas turbine engine, including combustors that contain catalysts (such as in U.S. Pat. No. 5,685,156) and thereby allow them to operate very lean and create very little $NO_x$. In this case, the CO produced in the gas phase combustion may be further oxidized to $CO_2$ when it contacts the surface of the catalyst. However, there is typically only enough catalyst to burn fuel to develop surface temperatures high enough to initiate the gas phase reaction. Consequently, only a portion of the CO diffuses to the surface of the catalyst from the gas stream before the gas exits the catalyst section. The residual CO remains in the gas and causes the CO emissions from the gas turbine to remain unacceptably high.

By way of a regenerator, as distinguished from a recuperator, catalytic removal of constituents is sought in U.S. Pat. No. 3,641,763. A regenerator is provided that employs a rotating matrix that is subjected to both exhaust gas from a turbine and cold compressed air from a compressor. The matrix is coated or impregnated with a catalyst. Thereby, the rotating matrix is intended to accomplish both heat exchange and catalysis. Similarly, and in the context of a turbocharged reciprocating engine, U.S. Pat. No. 3,713,294 provides a regenerator impregnated with a catalyst.

While the above designs address, to a limited extent, catalysis by a regenerator, they do not address catalysis by means of a recuperator. Further, a method of placing or coating a catalyst immediately upstream of or within a recuperator is evidently unaddressed by the prior art. In particular, the prior art does not appear to address optimizing system efficiency by selectively placing a catalyst within or upstream of the recuperator. Also seemingly omitted from the prior art is a method of reducing $NO_x$ emissions by tuning the combustor to produce lower $NO_x$ levels at the turbine exhaust and catalyzing the recuperator to ameliorate the CO levels that are consequently increased.

Placement of a catalyst upstream of or within the recuperator puts the catalyst in an operating environment that is optimal for both performance and life. Placement within the combustor (as in U.S. Pat. No. 5,685,156) results in operating temperatures that are too high for long life with conventional, state-of-the-art catalysts. Placement downstream of the recuperator, i.e., in the engine exhaust duct, as is common in many applications, results in temperatures that are too low for efficient catalysis, particularly at low engine loads or in cold ambient conditions.

As can be seen, there is a need for an apparatus and method of catalyzing undesired constituents by means of a recuperator and/or via a method of placing or coating a catalyst within or immediately upstream of a recuperator. Another need is for a method of tuning a turbine, such as a microturbine, to lower $NO_x$ levels while ameliorating CO levels that would otherwise be increased with lower $NO_x$ levels.

Accordingly, in one aspect of the present invention, a fixed boundary recuperator comprises a gas inlet through which flows a gas; a gas outlet in communication with the gas inlet; an air inlet through which flows air, with the air being in heat exchange relationship with the gas; an air outlet in communication with the air inlet; and a catalyst disposed at least at one of a plurality of locations, with the locations selected from the group including a position immediately upstream of the recuperator and a position within the recuperator.

In another aspect of the present invention, a method of controlling undesired emissions from an engine comprises selecting a desired $NO_x$ emission level; altering at least one of a fuel-to-air mixture and an operating temperature in a combustor to produce the desired $NO_x$ emission level in a combusted gas having the undesired emissions; flowing the combusted gas into a recuperator downstream of a turbine; and catalyzing the undesired emissions at least at one of a plurality of locations, with the locations selected from the group that includes a position immediately upstream of the recuperator and a position within the recuperator.

These and other features, aspects and advantages of the present invention will become better understood with reference to the following drawings, description and claims.

BRIEF DESCRIPTION OF THE DRAWINGS

FIGS. 2a and 2b are schematic diagrams of a catalyzed recuperator according to an embodiment of the present invention;

DETAILED DESCRIPTION OF THE INVENTION

In general, the present invention enables the reduction of exhaust emissions, such as CO, $NO_x$, and unburned hydrocarbon (UHC) emissions, to acceptable levels over the full operating range of engine loads and ambient conditions. This is accomplished by the present invention with a catalyst 22 selectively positioned either immediately upstream of and/or within a recuperator 16. Thereby, the catalyst 22 is in a temperature operating regime that is optimal for both performance and life, while minimizing the impact of the catalyst 22 on the engine 10 envelope and efficiency.

Figure 1:
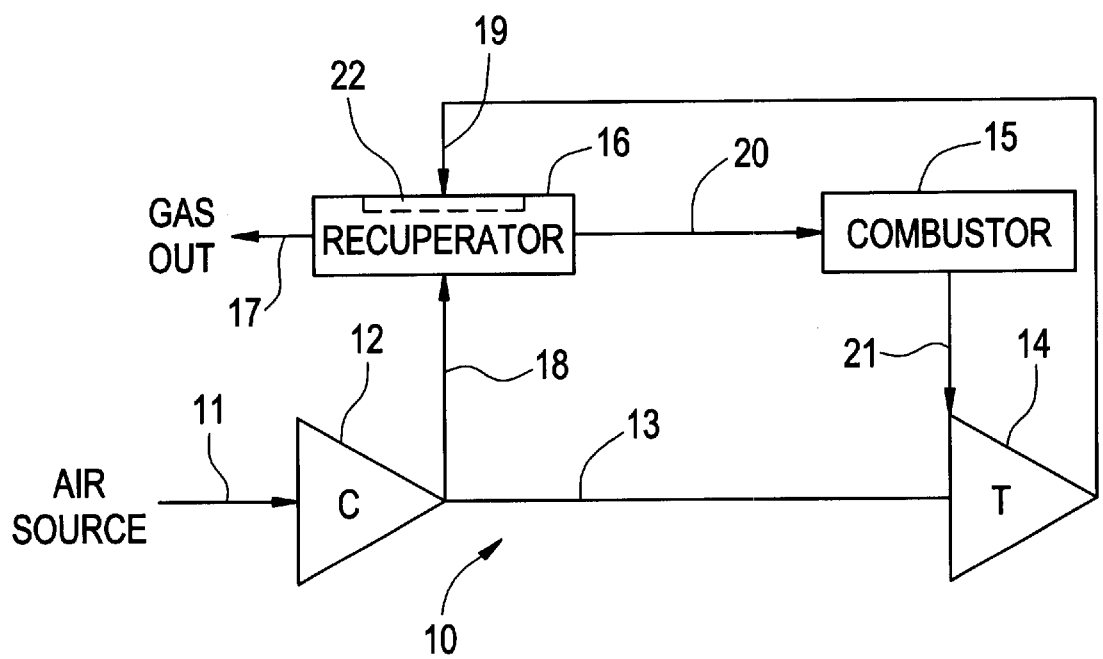
FIG. 1 is a schematic diagram of a turbine engine having a catalyzed recuperator according to the present invention.

More specifically, and in reference to FIG. 1, the present invention provides an engine 10 having an air source 11 that feeds to a compressor 12 of any well known design that can compress air. From the compressor 12, a compressed air or "air in" 18 flows into a fixed boundary recuperator 18. The term "fixed boundary recuperator" is intended to refer to recuperators well known in the art. The reference to "fixed boundary" generally means a stationary boundary or fixed heat exchange core area at which heat exchange occurs. Accordingly, a "fixed boundary recuperator" is to be distinguished from a regenerator having a rotating matrix, such as that shown in U.S. Pat. No. 3,641,763.

The recuperator 18 enables the compressed air 18 to absorb heat, as further described below, and exit the recuperator as heated air or "air out" 20. The heated air 20 then flows into a combustor 15 of any well-known design where the heated air is combusted with a fuel (not shown). The combustion produces a combusted gas 21 that contains various undesired emissions (such as CO and $NO_x$) and enters a turbine 14. As seen in FIG. 1, the turbine 14 is engaged to the compressor 12 by a shaft 13. Thereby, the rotation of the turbine 14 from the combusted gas 21 is transferred to the compressor 12.

A turbine exhaust gas or "gas in" 19 moves from the turbine 14 and into the downstream recuperator 16. Within the recuperator 16, and specifically at the heat exchange core area 31 (FIG. 2b), the "gas in" 19 is placed in heat exchange relationship with the compressed air 18 so that the compressed air 18 is warmed and the "gas in" 19 is cooled. As schematically shown in FIG. 1, the recuperator 16 includes a catalyst 22. However, and as further described below, the catalyst 22 can be not only within and at the gas side of the recuperator 16 itself, but also immediately upstream of the gas side of the recuperator 16. Moreover, the catalyst 22 can be placed at one or more of the foregoing locations. In any event, the catalyst 22 catalyzes the undesired emissions in the turbine exhaust gas. As a result, a "gas out" 17 from and/or downstream of the recuperator 16 has acceptable levels of the undesired emissions.

Referring to FIGS. 2a and 2b, and in one embodiment of the invention, the recuperator 16 is schematically shown to include a plenum 29 (not shown in FIG. 1). FIG. 2a is a plan view from one side of the recuperator 16 and plenum 29, while FIG. 2b is a cross sectional view from another side of the recuperator 16 and plenum 29. The plenum 29 comprises a housing with a plenum inlet 23 that receives the "gas in" 19 from the turbine 14. From the plenum inlet 23, the gas in 19 flows across and through the catalyst 22 that is immediately upstream of the gas side of the heat exchange core area 31, as shown in FIG. 2b. Upon the undesired emissions in the "gas in" 19 being reduced to a desired level, the abated gas exists as the "gas out" 17 from a gas outlet 26.

In the embodiment of FIGS. 2a and 2b, the catalyst 22 is selectively positioned within the recuperator 16 but upstream of the heat exchange core area 31 to aid in the elimination of undesirable emissions of the engine 10 over a wide operating regime. Catalytic oxidation of CO and many hydrocarbons can be best when the inlet temperature of the catalyst 22 is above about 400° F. However, low-cost substrates 27 (further described below) and catalyst materials can be limited to about 1200° F. based on commonly available stainless steel substrates. Nevertheless, other substrate materials can be used. The area in and about the gas inlet to the recuperator 16 meets this temperature range over the entire engine-operating envelope. Since there is ample volume in the plenum 29 or in the heat exchange core area 31, the catalyst 22 can be made large enough in cross sectional area so that the pressure drop of the gas flowing through the catalyst 22 is very low. This ensures that the impact of the catalyst 22 on system efficiency is almost negligible.

Figure 3:
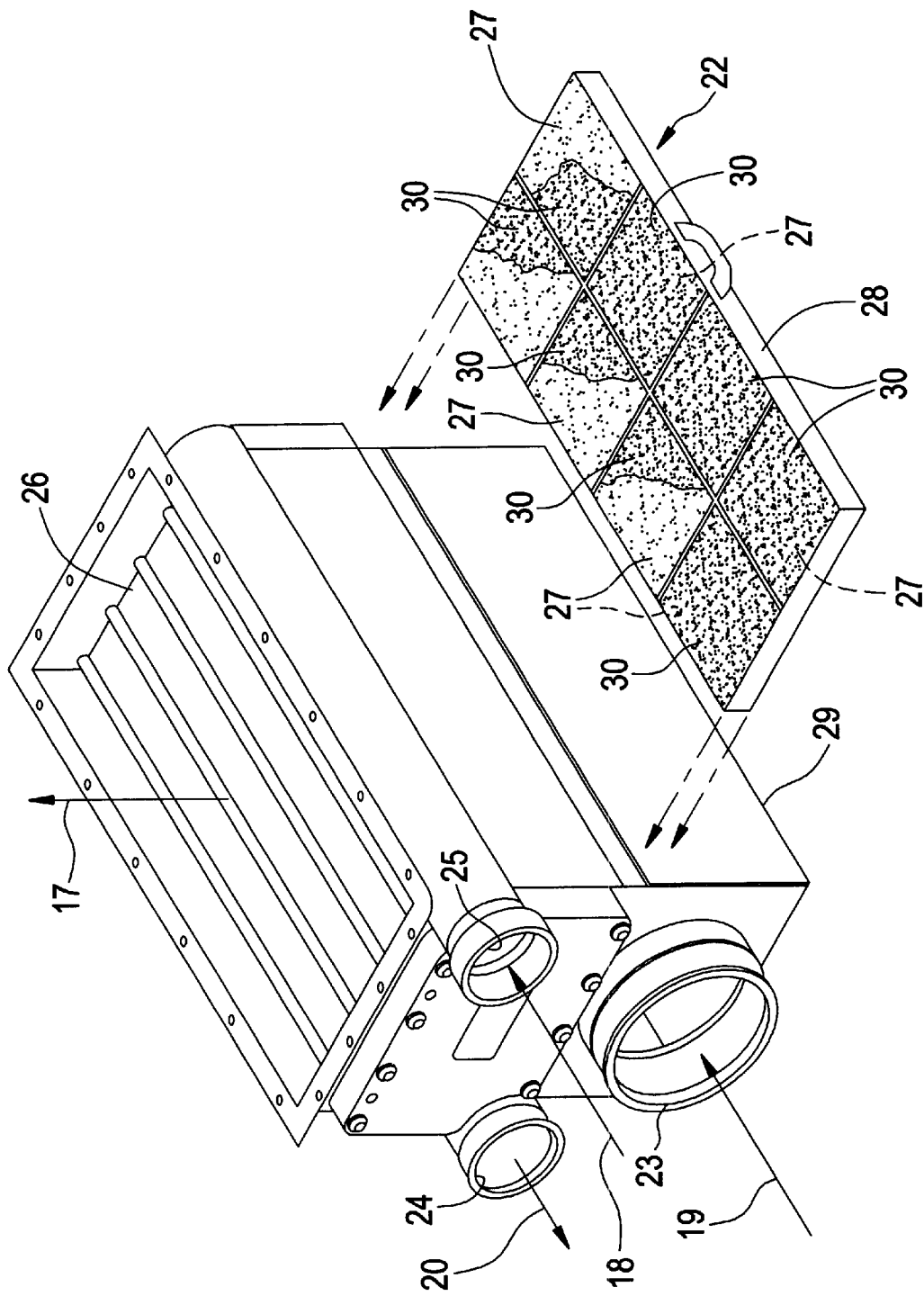
FIG. 3 is a schematic, perspective view of a catalyzed recuperator according to another embodiment of the present invention.

Another embodiment of the catalyst 22 upstream of the heat exchange core area 31 of the recuperator 16 is shown in FIG. 3. Specifically, the catalyst 22 is removable from the recuperator 16. The provision of a removable catalyst 22 enables easy and efficient changing of the catalyst 22. In this embodiment, the catalyst 22 includes a support 28 that supports a catalyst 22 directly, or which supports a plurality of gas-diffusible substrates 27 onto which a coating 30 of catalyst material has been applied. The support 28 can include a tray that slides in and out of the plenum 29. The particular catalyst material can vary and include such well-known materials such as platinum, palladium, rhodium, iridium, etc. Likewise, the particular substrate 27 material can vary and include materials such as Fecralloy or stainless steel honeycombs or ceramic honeycombs in order to allow gas diffusion. Further, the substrate 27 need not be in a honeycomb configuration and can be in a packed bed configuration loaded with a pelletized catalyst, for example. Preferred methods of coating the catalyst material onto a substrate—whether a part of or separate from the recuperator 16 itself—are further described below.

Figure 4:
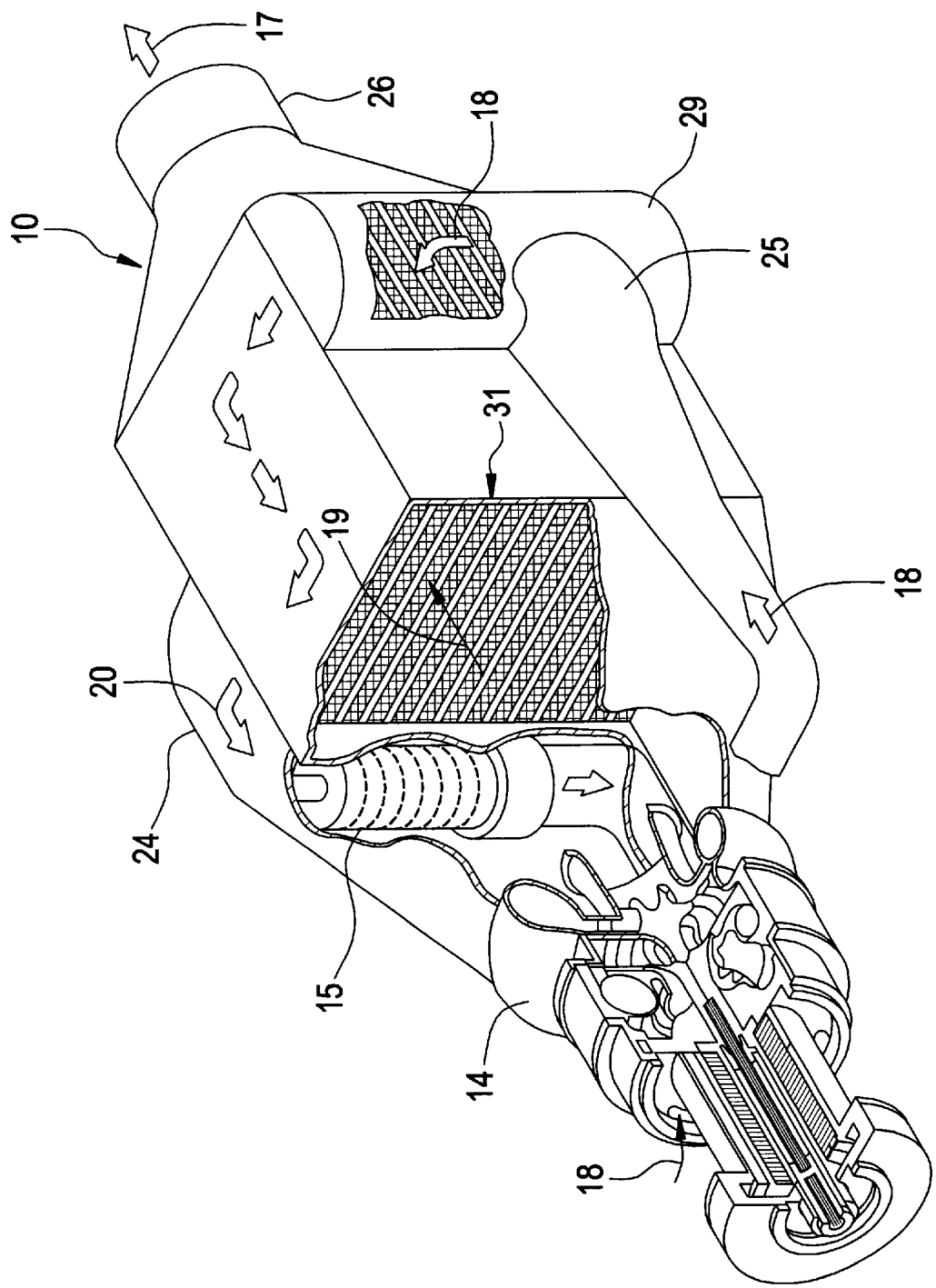
FIG. 4 is a schematic, perspective view of a catalyzed recuperator according to a further embodiment of the present invention.

FIG. 4 schematically shows a further embodiment of a catalyzed recuperator 16 according to the present invention. As in the embodiments depicted in FIGS. 2a and 2b and FIG. 3, the turbine 14 produces a "gas in" 19 that flows through a gas inlet (not shown) to the recuperator 16. Upon heat exchange in the core area 31 of the recuperator 16, the "gas out" 17 exits through the gas outlet 26. Concurrently, the "air in" 18 enters the core area 31 via an air inlet 25 and the "air out" 20 exits via an air outlet 24. The "air out" 20 then flows into the combustor 15. Although not shown, the fins or surfaces of the gas side core area 31 are coated with the catalyst 22.

In the current embodiment, the catalyst 22 can be applied to the hot side (combusted gas flow side) of the recuperator core 31. Several advantages can be achieved through this approach. First, integrating the catalytic function with the recuperator eliminates the need for a separate catalyst unit. This will reduce the cost, weight and accessories associated with the use of a substrate material. In addition, the pressure drop introduced by a separate unit can also be reduced. To improve the heat transfer efficiency, the heat exchanging surface of the recuperator core 31 is usually designed to ensure maximum heat transfer between the hot gas flow and the recuperator plate within the flow resident time. This type of design commonly involves a torturous flow path and enhanced surface area which are also ideal in facilitating gas phase-surface catalytic reaction and in improving the catalyst lifetime.

In other embodiments, the coating 30 of catalyst material can be placed at selected locations other than at the core area 31, such as when a selected location provides a particular operating temperature range. In one instance, the coating 30 can be applied to the gas inlet and/or gas outlet 26 of the recuperator 16. For example, the gas inlet and/or outlet 26 may have on their interior surface the coating 30 in order to eliminate the need for the tray 28. Alternatively, the coating 30 may be placed outside of the recuperator 16, such as on a substrate 27 that is immediately upstream of the gas inlet in order to make the coating 30 replaceable. Moreover, the coating 30 may be within the headspace of the recuperator 16, either upstream and/or downstream of the core area 31. In the above instances, the substrate 27 is oriented to the gas flow such that the substrate 27 need or need not be gas diffusible. The reference to a position "immediately" upstream of the recuperator 16 is intended to refer to positions outside of the recuperator 16, but not within an upstream engine component such as the combustor 15.

Figure 5:
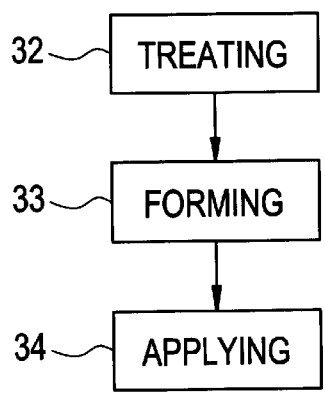
FIG. 5 is a flowchart depicting a method of coating a catalyst within or about a recuperator according to an embodiment of the present invention.

As shown in FIG. 5, a method of producing the catalyst coating 30 includes a treating step 32 that treats a gas side surface (i.e., substrate) of the heat exchange core area 31, for example, to form a high surface area metal oxide layer in a forming step 33. "High surface area metal oxide" is intended to refer to the metal oxides with specific surface area ranging from about 5 to 300 $M^2$/gram, based on the oxide weight. The oxide coating can be formed by a simple step of heating in air or oxygen flow if the material of the gas side surface is selected to form such oxide coating upon heating. As an example, the surface material can be a stainless steel that contains aluminum and which segregates to the surface of the alloy to form an oxidation resistant surface of alumina (i.e., oxide coating). In such instance, the heating can occur from about 400 to 1100° F. over a period of time from about 30 to 300 minutes. The aluminum oxide layer thus formed can then be catalyzed directly by impregnating it with a catalytic precursor solution followed by a calcination step.

Alternatively, the metallic materials used in the surface of core 31 do not have to contain aluminum. In the treating step 32, a thin metal oxide layer may be formed which is not alumina. The component of this metal oxide layer depends on the alloy content used in the core 31. For example, iron oxide, nickel oxide and chromium oxide can be formed when stainless steel metal is used for the core 31 after the treating step 32. This type of metal oxide layer, though typically low in surface area, can be used as a sub-layer for the coating of an additional layer of a high surface area metal oxide through a washcoating method. Preparing a metal oxide sub-layer for additional washcoating has several advantages. First, it improves the hydrophilicity of the metal surface and facilitates the water based washcoating process. It also increases the mechanical strength of the washcoated metal oxide layer by forming strong $M_1$—O—$M_2$ bonds during the calcination process, where $M_1$ refers to the metal used in the substrate and $M_2$ refers to the metal in the metal oxide overcoat layer.

Figure 6:
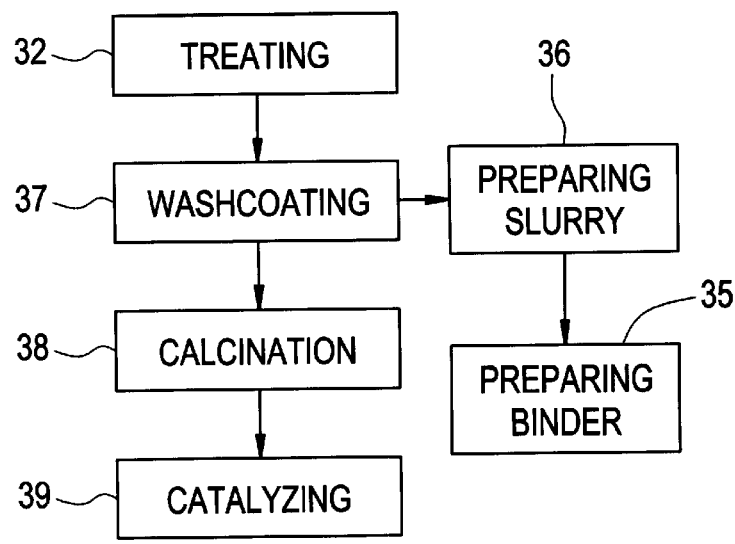
FIG. 6 is a flowchart depicting another method of coating a catalyst within or about a recuperator according to an embodiment of the present invention.

In a preferred embodiment depicted in FIG. 6, the recuperator core 31 can be coated with high surface area, refractory metal oxides to significantly enhance the catalytic surface area after the treating step 32. The process of washcoating can be described as including the steps of binder preparation 35, slurry preparation 36 and washcoating 37. In the binder preparation step 35, Boehmite powder, a mixture of aluminum oxide and aluminum hydroxide, is mixed with concentrated nitric acid and deionized water. The mixture is agitated and refluxed under about 80 to 120° C. up to about 10 hours until the entire solid is dissolved. After the binder is made, it will be used to mix with refractory metal oxides and deionized water to form a washcoat slurry in step 36. Refractory metal oxides (including gamma alumina, Boehmite, porous silica, titania, zirconia, ceria, etc.) can be used for this purpose. In the present embodiment, Boehmite and alumina are used to mix with deionized water and the binder 35. The mixture in step 36 is agitated continually at room temperature from about 2 to 10 hours until the solid particles are completely suspended in the solution and ready for washcoating.

The recuperator core 31 is first treated through step 32 before the washcoating step 37. During the washcoating step 37, the core 31 is briefly immersed in the slurry prepared in step 36 before the slurry is removed. In a preferred embodiment, a partial vacuum is generated around the core 31 and the slurry is gradually filled into the container and submerges the core 31 to completely wet the internal surface of the recuperator core 31 with the slurry. After the surface of combusted gas side of the core 31 is completely wetted by the slurry prepared in step 36, the slurry is then drained. Excess slurry mixture is removed with a highspeed airflow, such as the airflow from an airknife. A layer of mixture is formed over the surface and partially dried after the removal of excess slurry and solvent.

Following the washcoating step 37, the core 31 is subsequently calcined in the calcination step 38. During the calcination step 38, the core 31 is subjected to heating in hot air with a temperature ranging from about 800° F. to 1100° F. The calcination step 38 usually takes from about 2 to 10 hours under such temperature. During the calcination process, the coated layer is first dried then gradually undergoes a phase transition in which the hydrolyzed aluminum oxide is converted into gamma alumina with high surface area. The surface area of such prepared gamma alumina ranges from about 150 to 300 $M^2$/gram. The coated layer is also hardened during the phase transition process and forms a strong interaction with the pretreated sub-layer from step 32 through metal-oxygen-metal bonding. The coated layer thickness ranges from about 5 to 60 microns. The preferred thickness is about 10 to 30 microns. If needed, steps 35 to 38 can be repeated to ensure that the preferred layer thickness is achieved.

Other methods of applying the washcoat slurry 36 to the surface of core 31 can also be used to form a uniform coated layer. These methods include painting, spraying of the slurry and the like.

After the forming step 33 (FIG. 5) or washcoating step 37 (FIG. 6), the catalyst materials will be applied to the metal oxide layer through a catalyzing step 34 (FIG. 5) or 39 (FIG. 6). In a preferred embodiment, the catalyst is applied to the coated surface through an impregnation method that is known in the field of catalysis. The catalyst precursors, usually in the form of a metal salt solution, are applied to the coated layers. The catalyst metals used for this embodiment are typically those known to the art. They include the precious metals such as platinum, palladium, ruthenium, rhodium, iridium, gold, etc. The elements of a transition metal group—such as copper, manganese, nickel, iron, cobalt, chromium, cerium, etc.—can also be added to a precious metal to promote catalytic oxidation of carbon monoxide and residual hydrocarbons. The precursor salt solutions used in this embodiment are generally chlorine free to avoid corrosion between the coated layer and substrate in the core 31. They are typically in the form of a nitrate, sulfate or sulfite. For example, platinum nitrate or platinum sulfite can be used.

The metal precursor impregnation can be achieved simply by immersing the core 31 into the precursor solution. Alternatively, a partial vacuum is drawn around core 31 to remove the air pockets and the catalyst precursor solution is gradually filled into a container and submerges the core 31 in order to wet only the internal gas side surfaces of the recuperator core with the catalyst solution. After sufficient interaction between the catalyst solution and coated surface, the catalyst solution is drained and excess liquid is removed.

Following a drying step, the impregnated core 31 will be calcined in flowing air in a temperature range of about 800° F. to 1100° F. for about 30 to 300 minutes. Under such condition, the catalyst precursor will be converted to finely dispersed metal crystallites or metal oxide crystallites, supported by high surface area metal oxide coating materials.

Another embodiment of preparing a washcoated/catalyzed surface involves catalyzing refractory metal oxides before the step 36 of preparing the slurry. The catalyst metal precursor solution can be applied directly to metal oxide powder through a wet-incipient method, followed by drying and calcination to form catalyzed metal oxide powder. The catalyzed oxide powder will then be used to prepare the slurry in step 36, followed by washcoating 37 and calcination 38. The advantage of this approach is to eliminate the catalyzing step 39. Another advantage is the feasibility of using a broader range of catalyst precursors, including those containing chlorine such as chloro-platinic acid.

Yet another embodiment of washcoating and catalyzing the recuperator core 31 is to treat, washcoat and catalyze only a portion or portions of the core 31 instead of the entire unit. For example, the catalyst 22 may be applied only to the portion close to the gas or plenum inlet 23. Because this portion is subject to higher temperature than the downstream portions, it provides higher catalytic activity and better utilization of the catalytic material.

In another aspect, the present invention enables the engine 10 to be tuned for various emission levels. For example, a low-emissions combustor 15 may have a limited ability to operate efficiently over a wide operating range, which adversely affects exhaust emissions from the combustor 15 at part power or in cold ambient conditions. $NO_x$ emissions can be lowered by operating the combustor 15 at very lean fuel-to-air mixture ratios and/or at a low operating temperature. Doing so, however, can result in high CO and HC emissions from the combustor 15. In other words, low fuel-to-air ratios and/or low operating temperatures do not promote the oxidation of CO, for example. But in accordance with the present invention, the turbine 14 exhaust emissions can be reduced to acceptable emission levels over the full operating range of engine loads and ambient conditions with the catalyst 22 selectively positioned vis-à-vis the recuperator 16.

Accordingly, the present invention provides a method of controlling undesired emissions by selecting an acceptable or desired $NO_x$ level. This level is reached by altering the fuel-to-air mixture in the combustor 15 and/or altering the operating temperature range of the combustor 15. Specifically, the fuel-to-air mixture is lowered and, thereby, the operating power range is increased. Concurrently, and optionally, the operating temperature range is lowered. The combusted gas 21 containing the acceptable or desired $NO_x$ level, however, has an undesired CO level that is maintained. But the catalyst 22 is utilized at a selected location to oxidize the CO. The particular location of the catalyst 22 can be based on a catalyzing temperature that will provide the acceptable levels of emissions.

EXAMPLES

Example 1

A binder solution was prepared by mixing 0.91 Kilograms of Boehmite (UOP Versal 250), 3.64 Kilograms of concentrated $HNO_3$ (15 N) and 18.2 Kilograms of deionized water. The mixture was heated in a reflux reactor to 80° C. while being vigorously agitated for over eight hours. The Boehmite powder was completely dissolved at the end of the process and the mixture was transformed from a milky white slurry to yellowish, translucent solution.

Example 2

An aluminum oxide slurry was prepared by mixing 16.8 Kilograms of the binder from Example 1, 16.8 Kilograms of Boehmite (UOP Versal 250) and 46.4 Kilograms deionized water. The mixture was agitated vigorously in a batch reactor at ambient temperature for 8 hours. The slurry sample was taken from the reactor for viscosity, density and pH measurement. The measurement yielded a slurry density of 1.16 gram/cm$^3$, pH of 3.85 and viscosity of 14 centipose.

Example 3

A recuperator made of stainless steel consisted of a hot side and a cold side. The hot side contacts directly with the emission gas from the upstream combustor that contains carbon monoxide, steam, and uncombusted air. The surface of the recuperator hot side was first washed by nitric acid, followed by rinsing with deionized water and drying. The hot side surface was then washcoated in the slurry prepared according to Example 2 under vacuum, followed by airknifing to remove the excess slurry, drying, and calcination at 1000° F. for four hours. The washcoating process was repeated once more and final aluminum oxide loading on the heat-exchanging surface of the recuperator was about 0.6 gram/inch$^3$. After aluminum oxide was formed on the metal surface, it was further catalyzed with platinum sulfite solution under vacuum using a typical impregnation method known to the art, followed by calcination in air to decompose platinum sulfite to highly dispersed metallic Pt and platinum oxide.

Example 4

The catalyzed recuperator from Example 3 was connected downstream of a simple, low cost combustor. Carbon monoxide levels at both upstream (before) and downstream (after) the recuperator was recorded when the combustor engine was set at different output power level.

Example 5

Figure 7:
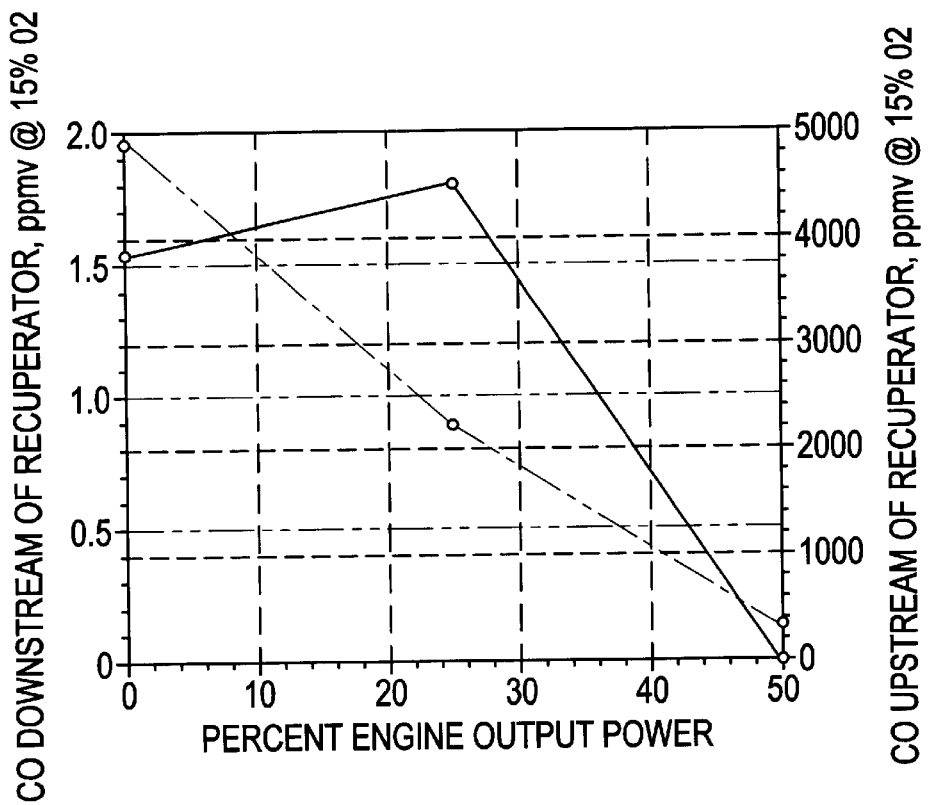
FIG. 7 is a graph of CO emissions downstream of a catalyzed recuperator versus engine output power and CO emissions upstream of a catalyzed recuperator versus engine output power according to an embodiment of the present invention.

The graph in FIG. 7 shows test results from an embodiment of the present invention. In this case, a low-cost combustor has been tuned to give very low $NO_x$ emissions, with the result that the part-load CO emissions at the recuperator inlet are high at low engine load conditions. As illustrated in FIG. 7, the catalyzed recuperator can be used to reduce these emissions to an acceptable level.

As can be appreciated by those skilled in the art, the present invention provides an apparatus and method of catalyzing undesired emissions by means of a recuperator. Also provided is a method of placing or coating a catalyst upstream of, within, or downstream of a recuperator. Further provided by the present invention is a method of tuning a turbine, such as a microturbine, to lower $NO_x$ levels while also enabling the reduction of CO levels.

It should be understood, of course, that the foregoing relates to preferred embodiments of the invention and that modifications may be made without departing from the spirit and scope of the invention as set forth in the following claims.

We claim:

1. A fixed boundary recuperator, comprising:
   a gas inlet through which flows a gas;
   a gas outlet in communication with said gas inlet;
   an air inlet through which flows an air, said air being in heat exchange relationship with said gas;
   a heat exchanger core having a heat exchanger core area surface at which said heat exchange relationship occurs;
   an air outlet in communication with said air inlet; and
   a catalyst disposed at least at one of a plurality of locations in communication with said gas, said locations selected from the group that includes a position immediately upstream of said heat exchanger core, a position within said heat exchanger core, and a position immediately downstream of said heat exchanger core;
   wherein said catalyst comprises a catalyst material supported by a support that is removable from said recuperator.

2. The recuperator of claim 1, wherein said heat exchanger core area surface comprises a gas side surface and wherein said catalyst comprises a coating of catalyst material on said recuperator gas side surface.

3. The recuperator of claim 2, wherein said coating is disposed on said gas inlet.

4. The recuperator of claim 2, wherein said coating is disposed on said gas outlet.

5. The recuperator of claim 2, wherein said coating is disposed on said heat exchange core area surface within said recuperator.

6. The recuperator of claim 1, further comprising a substrate disposed at one of said plurality of locations and wherein said catalyst comprises a catalyst material on said substrate.

7. The recuperator of claim 6, wherein said substrate is within said heat exchanger core.

8. The recuperator of claim 6, wherein said substrate is outside of said heat exchanger core.

9. The recuperator of claim 1, wherein said support comprises a tray.

10. The recuperator of claim 9, further comprising a substrate on which said catalyst material is placed, said substrate being supported by said tray.

11. The recuperator of claim 9, further comprising a plenum upstream said heat exchange core, and wherein said tray is removably mounted in said plenum.

12. The recuperator of claim 10, wherein said substrate is removable from said tray.

13. The recuperator of claim 10, further comprising a plurality of substrates supported by said tray.

* * * * *